United States Patent
Kato et al.

(10) Patent No.: US 11,780,750 B2
(45) Date of Patent: Oct. 10, 2023

(54) FLUID STERILIZATION DEVICE

(71) Applicant: Toshiba Lighting & Technology Corporation, Yokosuka (JP)

(72) Inventors: Takeo Kato, Ehime-ken (JP); Atsushi Fujioka, Ehime-ken (JP); Naoto Sakurai, Ehime-ken (JP); Seiya Iida, Ehime-ken (JP); Takanori Ochi, Ehime-ken (JP)

(73) Assignee: Toshiba Lighting & Technology Corporation, Yokosuka (JP)

( * ) Notice: Subject to any disclaimer, the term of this patent is extended or adjusted under 35 U.S.C. 154(b) by 146 days.

(21) Appl. No.: 17/401,636

(22) Filed: Aug. 13, 2021

(65) Prior Publication Data

US 2022/0098058 A1    Mar. 31, 2022

(30) Foreign Application Priority Data

Sep. 28, 2020  (JP) ................. 2020-162415

(51) Int. Cl.
*C02F 1/32* (2023.01)

(52) U.S. Cl.
CPC ........ *C02F 1/325* (2013.01); *C02F 2201/004* (2013.01); *C02F 2201/3222* (2013.01); *C02F 2303/04* (2013.01)

(58) Field of Classification Search
CPC .. C02F 1/003; C02F 2307/02; C02F 2307/04; C02F 1/002; C02F 1/32; C02F 1/48; C02F 1/72; C02F 1/00; A45F 2003/163
See application file for complete search history.

(56) References Cited

U.S. PATENT DOCUMENTS

| | | | |
|---|---|---|---|
| 5,474,748 A | 12/1995 | Szabo | |
| 5,935,431 A | 8/1999 | Korin | |
| 2018/0155215 A1 | 6/2018 | Torii | |
| 2018/0257953 A1* | 9/2018 | Mochizuki | ............... A61L 9/20 |
| 2019/0256380 A1 | 8/2019 | Ochi et al. | |

FOREIGN PATENT DOCUMENTS

| | | |
|---|---|---|
| FR | 2493705 A1 | 5/1982 |
| JP | 2017-051290 A | 3/2017 |
| JP | 2018-069166 A | 5/2018 |
| JP | 2020-044515 A | 3/2020 |

* cited by examiner

*Primary Examiner* — Walter D. Griffin
*Assistant Examiner* — Cameron J Allen
(74) *Attorney, Agent, or Firm* — Banner & Witcoff, Ltd.

(57) ABSTRACT

A fluid sterilization device according to an embodiment includes: a tube portion; a supply head in one end portion of the tube portion; a discharge head provided in the other end portion thereof and having a first hole penetrating a space between end faces on the tube portion side and the opposite side; a holder having a flange and a protruding portion projecting from one surface of the flange and provided in the first hole; a substrate on an end face of the protruding portion on a side opposite to the flange side; a light-emitting element provided on a surface of the substrate on a side opposite to the protruding portion side and emitting ultraviolet rays; a window provided in the first hole and facing the light-emitting element; and a desiccant provided outside the discharge head and in a space communicating with the first hole or in the first hole.

20 Claims, 3 Drawing Sheets

FLUID STERILIZATION DEVICE

CROSS-REFERENCE TO RELATED APPLICATIONS

This application is based upon and claims the benefit of priority from Japanese Patent Application No. 2020-162415, filed on Sep. 28, 2020; the entire contents of which are incorporated herein by reference.

FIELD

Embodiments described herein relate to a fluid sterilization device.

BACKGROUND

A fluid sterilization device sterilizes a fluid such as water by irradiating the fluid with ultraviolet rays. For example, a fluid sterilization device including a tube portion through which a fluid flows and a light source provided in an end portion of the tube portion and irradiating the inside of the tube portion with ultraviolet rays is proposed. The fluid flowing in the tube portion is directly irradiated with some of the ultraviolet rays emitted from the light source. In addition, the ultraviolet rays emitted from the light source and incident on the inside surface of the tube portion are propagated while reflection is repeated in the tube portion.

Here, the temperature of the fluid flowing in the tube portion may be lower than the temperature of the environment where the fluid sterilization device is provided. In addition, the temperature of the environment may rise. In such cases, the temperature of the fluid sterilization device becomes lower than the temperature of the environment. In general, the environment where the fluid sterilization device is provided has air containing water vapor. Accordingly, dew condensation may occur on the fluid sterilization device when the difference between the temperature of the fluid sterilization device and the temperature of the environment increases.

When dew condensation occurs on the light source in this case, a light-emitting element provided in the light source may malfunction due to the water attributable to the dew condensation. In addition, some of the ultraviolet rays emitted from the light source may be absorbed by the water attributable to the dew condensation or scattered by the water attributable to the dew condensation to result in a decline in bactericidal effect. Further, the light source may be oxidized (corroded) or deteriorate due to the water attributable to the dew condensation.

Although it is conceivable in this case to supply dry air to the vicinity of the light source, a dry air supply device may become necessary, an increase in installation space may arise, or an increase in cost may arise.

Therefore, it is desired to develop a fluid sterilization device capable of suppressing the occurrence of dew condensation in the vicinity of a light source.

DETAILED DESCRIPTION

Figure 1:
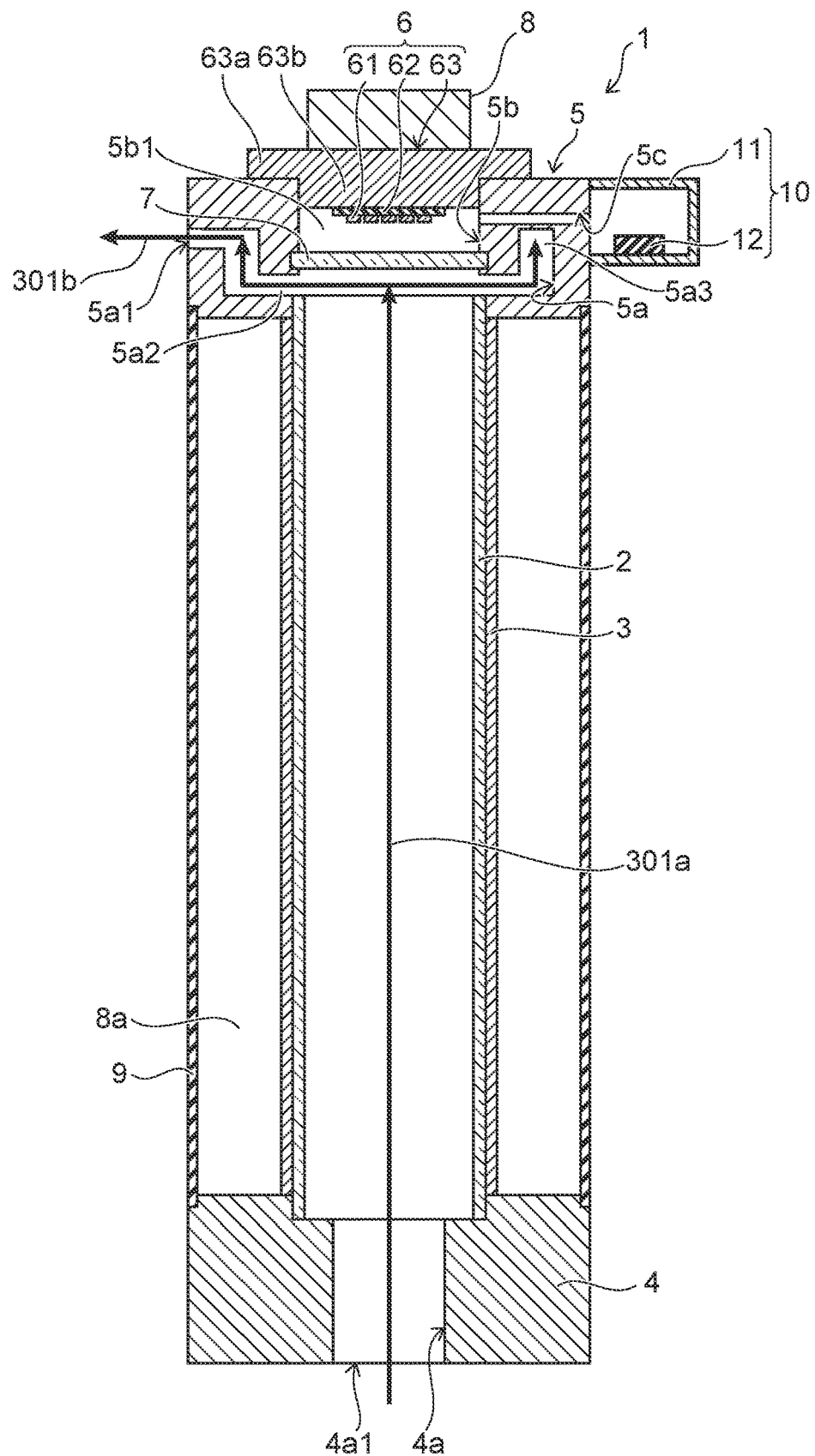
FIG. 1 is a schematic cross-sectional view for exemplifying a fluid sterilization device according to the present embodiment.

A fluid sterilization device according to an embodiment includes: a tube portion; a supply head provided in one end portion of the tube portion; a discharge head provided in the other end portion of the tube portion and having a first hole penetrating a space between an end face on the tube portion side and an end face on a side opposite to the tube portion side; a holder having a flange and a protruding portion projecting from one surface of the flange and provided in the first hole of the discharge head; a substrate provided on an end face of the protruding portion on a side opposite to the flange side; a light-emitting element provided on a surface of the substrate on a side opposite to the protruding portion side and emitting ultraviolet rays; a window provided in the first hole of the discharge head and facing the light-emitting element; and a desiccant provided outside the discharge head and in a space communicating with the first hole of the discharge head or in the first hole of the discharge head.

Hereinafter, embodiments will be exemplified with reference to the drawings. It should be noted that similar components in the drawings are denoted by the same reference numerals and detailed description thereof will be omitted as appropriate.

FIG. 1 is a schematic cross-sectional view for exemplifying a fluid sterilization device 1 according to the present embodiment.

As illustrated in FIG. 1, the fluid sterilization device 1 has, for example, a tube portion 2, a reflecting portion 3, a supply head 4, a discharge head 5, a light source 6, a window 7, a cooling unit 8, a cover 9, and a drying portion 10.

The tube portion 2 has a tubular shape, and its end portions on both sides are open. The tube portion 2 can be, for example, a cylinder tube. The material of the tube portion is not particularly limited insofar as it is resistant to ultraviolet rays and a fluid 301a to be sterilized. The material of the tube portion 2 can be, for example, quartz, stainless steel, or a fluororesin such as polytetrafluoroethylene (PTFE).

The reflecting portion 3 can be provided on the outside surface of the tube portion 2. The tube portion 2 may be formed of a material that transmits ultraviolet rays, examples of which include quartz. When some of the ultraviolet rays emitted from the light source 6 are transmitted through the tube portion 2 and leak to the outside, the treatment capacity of the fluid sterilization device 1 declines. With the reflecting portion 3 provided on the outside surface of the tube portion 2, the ultraviolet rays directed to the outside of the tube portion 2 can be reflected toward the inside of the tube portion 2. Accordingly, the utilization efficiency of the ultraviolet rays emitted from the light source 6 can be improved, and thus the number of light-emitting elements 61 can be reduced. By the light-emitting elements 61 being small in number, the size and cost of the light source 6 can be reduced.

The reflecting portion 3 is formed of a material having a high ultraviolet reflectance. The material of the reflecting portion 3 is, for example, aluminum, an aluminum alloy, silicon dioxide, polytetrafluoroethylene (PTFE), or the like. The reflecting portion 3 has a plate shape and can be attached to the outside surface of the tube portion 2. In addition, the reflecting portion 3 that has a film shape can be formed on the outside surface of the tube portion 2 using a film formation method such as a sputtering method and a vapor deposition method.

In addition, although a case where the reflecting portion 3 is provided on the outside surface of the tube portion 2 is exemplified, the reflecting portion 3 may be provided on the inside surface of the tube portion 2. However, it is preferable to provide the reflecting portion 3 on the outside surface of the tube portion 2 when corrosion or the like occurs or the material of the reflecting portion 3 melts out due to contact between the reflecting portion 3 and the fluid 301a (such as water).

In addition, the reflecting portion 3 can be omitted. For example, the reflecting portion 3 can be omitted when the tube portion 2 is formed of a material that reflects ultraviolet rays (such as a white inorganic material and a white resin).

The supply head 4 is provided in one end portion of the tube portion 2. A seal member such as an O-ring can be provided between the supply head 4 and the end portion of the tube portion 2. The seal member performs sealing such that the space between the supply head 4 and the tube portion 2 is liquid-tight.

The supply head 4 has, for example, a columnar shape and has a hole 4a penetrating the space between one end face and the other end face. One opening of the hole 4a is connected to the internal space of the tube portion 2. The other opening of the hole 4a is a supply port 4a1. A supply source of the fluid 301a can be connected to the supply port 4a1 via piping. In addition, a filter, a straightening vane, and so on can be provided in the hole 4a.

The material of the supply head 4 is not particularly limited insofar as it is resistant to the fluid 301a and ultraviolet rays. The material of the supply head 4 can be, for example, a metal such as stainless steel.

The discharge head 5 is provided in the other end portion of the tube portion 2. A seal member such as an O-ring can be provided between the discharge head 5 and the end portion of the tube portion 2. The seal member performs sealing such that the space between the discharge head 5 and the tube portion 2 is liquid-tight.

The discharge head 5 has, for example, a columnar shape and has a hole 5a, a hole 5b, and a hole 5c.

One opening of the hole 5a is connected to the internal space of the tube portion 2. The other opening of the hole 5a is a discharge port 5a1 provided in the side surface of the discharge head 5. A tank, a cleaning device, and so on can be connected to the discharge port 5a1 via piping.

In addition, a seal member such as an O-ring can be provided in the vicinity of the opening of the hole 5a on the tube portion 2 side. The seal member performs sealing such that the space between the discharge head 5 and the tube portion 2 is liquid-tight.

The material of the discharge head 5 is not particularly limited insofar as it is resistant to a sterilized fluid 301b and ultraviolet rays. The material of the discharge head 5 can be, for example, a metal such as stainless steel.

In addition, the hole 5a is a bent flow path. The hole 5a has a flow path 5a2 substantially parallel to the end face of the discharge head 5 on the tube portion 2 side and a flow path 5a3 extending in the axial direction of the discharge head 5.

The flow path 5a2 is open to the end face of the discharge head 5 on the tube portion 2 side. In addition, the window 7 is exposed on the inner wall of the flow path 5a2. The flow path 5a2 is, for example, a disk-shaped space.

One end portion of the flow path 5a3 is connected to the vicinity of the peripheral edge of the flow path 5a2. The discharge port 5a1 is connected to the other end portion of the flow path 5a3. The flow path 5a3 is, for example, a cylindrical space.

It should be noted that the internal space of the tube portion 2 is irradiated with some of the ultraviolet rays emitted to the flow path 5a2. In addition, some of the ultraviolet rays emitted to the internal space of the tube portion 2 are reflected by the reflecting portion 3. Accordingly, the fluid 301a is sterilized in the internal space of the tube portion 2 as well.

The hole 5b is open to the end face of the discharge head 5 on the side opposite to the tube portion 2 side and the flow path 5a2. In other words, the discharge head 5 has holes (the holes 5b and 5a) penetrating the space between the end face on the tube portion 2 side and the end face on the side opposite to the tube portion 2 side.

The hole 5b is provided with a protruding portion 63b of a holder 63, a substrate 62, and the light-emitting element 61.

The hole 5c is open to the side surface of the discharge head 5 and the inner wall of the hole 5b. It should be noted that the hole 5c may be open to the end face of the discharge head 5 on the side opposite to the tube portion 2 side and the inner wall of the hole 5b. In other words, one end portion of the hole 5c is connected to the hole 5b and the other end portion of the hole 5c is open to the outside of the fluid sterilization device 1.

The light source 6 is detachably provided on the discharge head 5.

The light source 6 has, for example, the light-emitting element 61, the substrate 62, and the holder 63.

The light-emitting element 61 is provided on the surface of the substrate 62 on the side opposite to the protruding portion 63b side. The light-emitting element 61 emits ultraviolet rays toward the window 7. The light-emitting element 61 can be one or more in number. When a plurality of the light-emitting elements 61 are provided, the plurality of light-emitting elements 61 can be connected in series. The light-emitting element 61 is not particularly limited insofar as it is an element that generates ultraviolet rays. The light-emitting element 61 can be, for example, a light-emitting diode, a laser diode, or the like.

The peak wavelength of the ultraviolet rays emitted from the light-emitting element 61 is not particularly limited insofar as a bactericidal effect is achieved. However, the bactericidal effect can be improved when the peak wavelength is 260 nm to 280 nm. Accordingly, it is preferable that the light-emitting element 61 is capable of emitting ultraviolet rays having a peak wavelength of 260 nm to 280 nm.

The substrate 62 has a plate shape and is provided on the end face of the protruding portion 63b of the holder 63 on the side opposite to the flange 63a side. A wiring pattern can be provided on the surface of the substrate 62. The material of the substrate 62 is preferably resistant to ultraviolet rays. The material of the substrate 62 can be, for example, ceramics such as aluminum oxide. The substrate 62 can be a metal plate the surface of which covered with an inorganic material (metal core substrate). Resistance to ultraviolet rays and high thermal radiation can be obtained when the material of the substrate 62 is ceramics or the like or the substrate 62 is a metal core substrate.

The holder 63 can be detachably provided on the discharge head 5. Although the light-emitting element 61 is longer in service life than a discharge lamp or the like, a decline in light-emitting efficiency arises as the lighting time increases. It is also conceivable that the light-emitting element 61 may malfunction and a lighting failure may arise. With the holder 63 detachably provided on the discharge head 5, the light-emitting element 61 can be replaced with ease.

The holder 63 has, for example, the flange 63*a* and the protruding portion 63*b*. The flange 63*a* and the protruding portion 63*b* can be integrally formed.

The flange 63*a* has a plate shape and is provided on the end face of the discharge head 5 on the side opposite to the tube portion 2 side. The flange 63*a* is attached to the discharge head 5 using, for example, a fastening member such as a screw.

The protruding portion 63*b* is provided on the surface of the flange 63*a* on the tube portion 2 side. The protruding portion 63*b* projects from one surface of the flange 63*a* and is provided in the hole 5*b* of the discharge head 5. The substrate 62 on which the light-emitting element 61 is mounted can be provided on the end face of the protruding portion 63*b* on the tube portion 2 side. In addition, the protruding portion 63*b* is capable of having a function of determining the position of the light-emitting element 61 with respect to the discharge head 5. For example, the side surface of the protruding portion 63*b* can be brought into contact with the inner wall of the hole 5*b* of the discharge head 5. In this manner, the position of the light-emitting element 61 with respect to the discharge head 5 can be determined.

In addition, the hole 5*b* of the discharge head 5 and the flow path 5*a*2 are separated by the window 7, and thus the light source 6 can be attached and detached even in a state where the fluid 301*a* is in the flow path 5*a*2. Accordingly, maintainability can be improved.

In addition, the holder 63 has a function of releasing the heat generated in the light-emitting element 61 to the outside. Accordingly, the holder 63 is preferably formed of a material having high thermal conductivity. The holder 63 can be formed of, for example, a metal such as aluminum, copper, and stainless steel. In addition, a thermal radiation fin can be provided on the end face of the holder 63 on the side opposite to the light-emitting element 61 side or the side surface of the holder 63.

The window 7 has a plate shape and is provided on the inner wall of the hole 5*b* of the discharge head 5 so as to be liquid-tight. In other words, the window 7 is provided in the discharge head 5 and one surface of the window 7 is exposed to the flow path 5*a*2 provided in the discharge head 5. The window 7 faces the light-emitting element 61. A space 5*b*1 can be provided between the window 7 and the light-emitting element 61. The window 7 is formed of a material that is capable of transmitting ultraviolet rays and resistant to ultraviolet rays and the fluid 301*a*. The window 7 is formed of, for example, quartz, a fluororesin that transmits ultraviolet rays, or the like.

In addition, an antireflection film can be provided on the surface of the window 7 on the light-emitting element 61 side. With the antireflection film provided, it is possible to suppress the ultraviolet rays emitted from the light-emitting element 61 being reflected by the window 7 and becoming difficult to irradiate the fluid 301*a*. In other words, the utilization efficiency of the ultraviolet rays emitted from the light-emitting element 61 can be improved.

In addition, an antifouling film can be provided on the surface of the window 7 on the tube portion 2 side. The fluid 301*a* supplied to the fluid sterilization device 1 may contain foreign matter. When foreign matter adheres to the window 7, it becomes difficult for the ultraviolet rays emitted from the light-emitting element 61 to pass through the window 7. With the antifouling film provided, foreign matter adhesion to the window 7 can be suppressed.

The cooling unit 8 can be provided on, for example, the side of the holder 63 opposite to the light-emitting element 61 side. The cooling unit 8 is, for example, a fan that supplies air to the holder 63. When the holder 63 is provided with a thermal radiation fin, the cooling unit 8 can be a fan that supplies air to the thermal radiation fin. In addition, the cooling unit 8 may, for example, supply a liquid to the flow path provided in the holder 63. In other words, the cooling unit 8 may be an air-cooled or liquid-cooled cooling unit.

It should be noted that the cooling unit 8 can be omitted depending on the number or heat generation amount of the light-emitting elements 61, the temperature or flow rate of the fluid 301*a*, and so on. However, with the cooling unit 8 provided, the temperature of the light-emitting element 61 is unlikely to exceed the maximum junction temperature even when the light-emitting element 61 is increased in number, applied electric power, and so on.

In addition, with the cooling unit 8 provided, the temperature of the light-emitting element 61 is unlikely to exceed the maximum junction temperature even when the temperature of the fluid 301*a* rises or the flow rate of the fluid 301*a* with a high temperature increases. Accordingly, the range of the fluid 301*a* that can be responded to can be expanded.

The cover 9 has a tubular shape, and the tube portion 2 and the reflecting portion 3 are stored in the internal space of the cover 9. The material of the cover 9 is not particularly limited insofar as it has a certain degree of rigidity. The material of the cover 9 can be, for example, a metal such as stainless steel. The cover 9 can be fixed to, for example, the supply head 4 and the discharge head 5. How to fix the cover 9 is not particularly limited. For example, one end portion of the cover 9 can be provided in the recess portion or groove provided in the supply head 4 and the other end portion of the cover 9 can be provided in the recess portion or groove provided in the discharge head 5. In addition, for example, flanges may be respectively provided in the end portions on both sides of the cover 9, one of the flanges may be fixed to the supply head 4 with a screw or the like, and the other flange may be fixed to the discharge head 5 with a screw or the like.

Here, the temperature of the fluid 301*a* flowing in the tube portion 2 may be lower than the temperature of the environment where the fluid sterilization device 1 is provided. For example, groundwater, spring water, or the like may be sterilized in a high-temperature period such as summer. In addition, the temperature of the environment where the fluid sterilization device 1 is provided may rise. For example, the temperature of the environment where the fluid sterilization device 1 is provided rises when a time of day of high temperature such as daytime is reached past a time of day of low temperature such as night and morning.

In such cases, the temperature of the fluid sterilization device 1 becomes lower than the temperature of the environment. In general, the environment where the fluid sterilization device 1 is provided has air containing water vapor. Accordingly, dew condensation may occur on the fluid sterilization device 1 when the difference between the temperature of the fluid sterilization device 1 and the temperature of the environment increases.

In this case, dew condensation may occur in the space 5*b*1 provided in the discharge head 5 as well. In the event of dew condensation in the space 5*b*1, the light-emitting element 61 provided in the light source 6 may malfunction due to the water attributable to the dew condensation. In addition, when the water attributable to the dew condensation adheres to the surface of the window 7 on the light-emitting element 61 side, some of the ultraviolet rays emitted from the light-emitting element 61 may be absorbed by the water or scattered by the water to result in a decline in bactericidal effect. Further, the holder 63 may be oxidized (corroded) or deteriorate due to the water attributable to the dew condensation.

In this regard, the fluid sterilization device 1 according to the present embodiment is provided with the drying portion 10.

The drying portion 10 has, for example, a housing 11 and a desiccant 12.

The housing 11 has a space inside and can be detachably provided on the discharge head 5. The housing 11 can be provided on the discharge head 5 so as to be airtight. For example, a seal member such as an O-ring and packing can be provided between the housing 11 and the discharge head 5. With the housing 11 attached to the discharge head 5, intrusion of the water vapor contained in the atmosphere outside the fluid sterilization device 1 into the internal space of the housing 11 can be suppressed.

Meanwhile, the internal space of the housing 11 communicates with the hole 5b (space 5b1) via the hole 5c. Accordingly, the water vapor contained in the space 5b1 is capable of reaching the internal space of the housing 11.

The desiccant 12 is provided in the internal space of the housing 11. The desiccant 12 is capable of containing, for example, silica gel, calcium oxide, calcium chloride, and so on. However, the desiccant 12 is not limited to what is exemplified and may be anything capable of adsorbing water vapor contained in the atmosphere.

According to the present embodiment, the desiccant 12 provided in the housing 11 is capable of adsorbing the water vapor contained in the space 5b1 via the hole 5c. Accordingly, the occurrence of dew condensation in the space 5b1 provided in the discharge head 5 can be suppressed even when the temperature of the fluid sterilization device 1 becomes lower than the temperature of the environment. As a result, malfunction of the light-emitting element 61, a decline in bactericidal effect, oxidation (corrosion) of the holder 63, and deterioration of the holder 63 can be suppressed.

In addition, the function of the desiccant 12 declines due to the amount of water vapor adsorption, aging, and so on. Accordingly, it is preferable to replace the desiccant 12 as needed or on a regular basis. According to the present embodiment, the housing 11 is detachably provided on the discharge head 5, and thus maintenance work such as inspection and replacement of the desiccant 12 is facilitated.

FIGS. 2A to 2D are schematic cross-sectional views for exemplifying the disposition of the desiccant 12 according to other embodiments.

In the embodiment exemplified in FIG. 1, the desiccant 12 is provided outside the discharge head 5. On the other hand, in the embodiments exemplified in FIGS. 2A to 2D, the desiccant 12 is provided in the hole 5b of the discharge head.

Figure 2A:
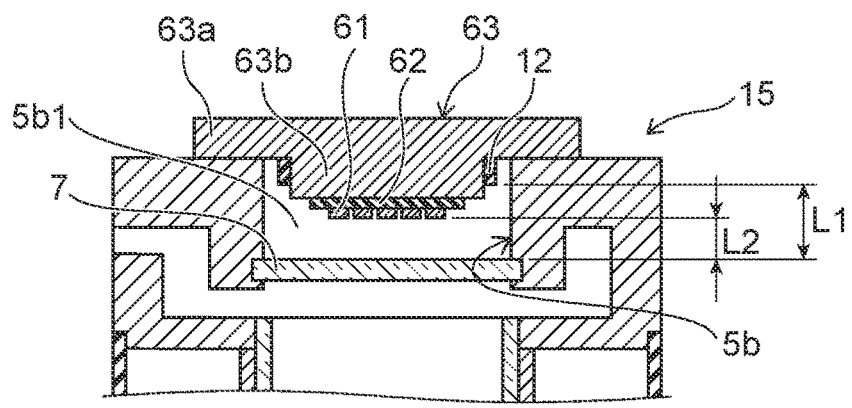
FIGS. 2A to 2D are schematic cross-sectional views for exemplifying the disposition of a desiccant according to other embodiments.
Figure 2B:
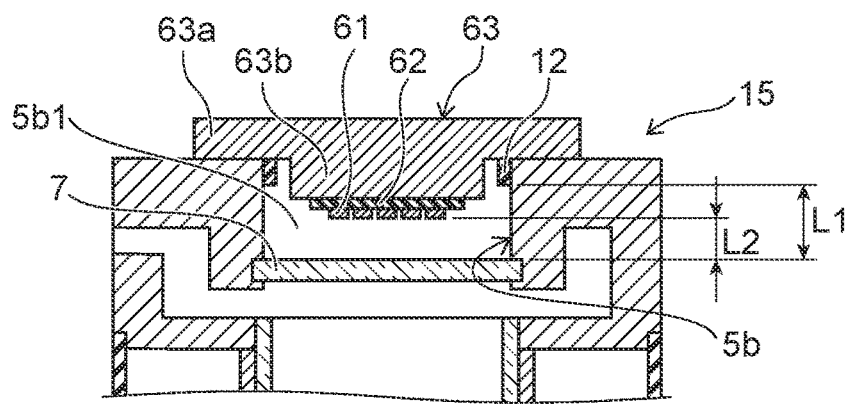

As illustrated in FIGS. 2A and 2B, a discharge head 15 can be similar in configuration to the discharge head 5 described above. However, the hole 5c is not provided. In addition, a gap is provided between the inner wall of the hole 5b and the side surface of the protruding portion 63b. Further, the desiccant 12 is provided in the gap. In this case, the desiccant 12 may be provided on at least one of the inner wall of the hole 5b and the side surface of the protruding portion 63b.

In this manner, the distance between the desiccant 12 and the space 5b1 can be shortened. Accordingly, it becomes easy to adsorb the water vapor contained in the space 5b1 using the desiccant 12.

Figure 2C:
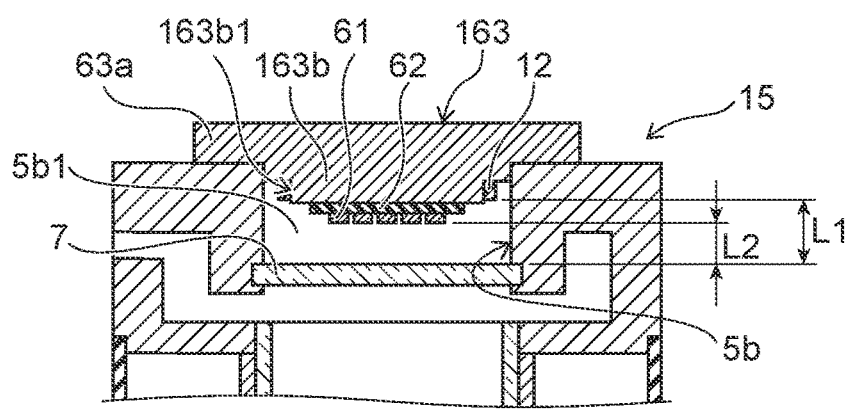

As illustrated in FIG. 2C, a holder 163 can be similar in configuration to the holder 63 described above. However, a recess portion 163b1 is provided in the side surface of a protruding portion 163b. Further, the desiccant 12 is provided in the recess portion 163b1. In addition, a part of the side surface of the protruding portion 163b is in contact with the inner wall of the hole 5b of the discharge head 15.

In this manner, the distance between the desiccant 12 and the space 5b1 can be shortened. Accordingly, it becomes easy to adsorb the water vapor contained in the space 5b1 using the desiccant 12.

In addition, since a part of the side surface of the protruding portion 163b is in contact with the inner wall of the hole 5b of the discharge head 15, the light-emitting element 61 can be positioned with respect to the discharge head 15.

Figure 2D:
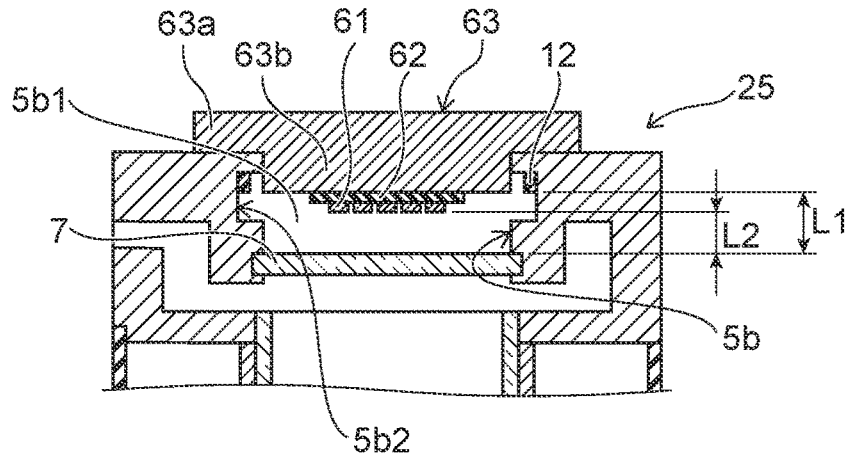

As illustrated in FIG. 2D, a discharge head 25 can be similar in configuration to the discharge head 5 described above. However, the hole 5c is not provided. In addition, a recess portion 5b2 is provided in the inner wall of the hole 5b. Further, the desiccant 12 is provided in the recess portion 5b2. In addition, the side surface of the protruding portion 63b is in contact with the inner wall of the hole 5b of the discharge head 25.

In this manner, the distance between the desiccant 12 and the space 5b1 can be shortened. Accordingly, it becomes easy to adsorb the water vapor contained in the space 5b1 using the desiccant 12.

Further, since the side surface of the protruding portion 63b is in contact with the inner wall of the hole 5b of the discharge head 25, the light-emitting element 61 can be positioned with respect to the discharge head 25.

Here, the desiccant 12 may deteriorate due to the ultraviolet rays emitted from the light-emitting element 61 when the desiccant 12 is provided in the hole 5b of the discharge head.

Accordingly, when the desiccant 12 is provided in the hole 5b of the discharge head, "L1 (mm)≥L2 (mm)" is preferable when, for example, L1 (mm) is the distance between the desiccant 12 and the window 7 and L2 (mm) is the distance between the ultraviolet emitting surface of the light-emitting element 61 and the window 7 as illustrated in FIGS. 2A to 2D.

In this manner, it is possible to suppress the ultraviolet rays emitted from the light-emitting element 61 being directly incident on the desiccant 12. Accordingly, deterioration of the desiccant 12 attributable to ultraviolet rays can be suppressed.

Figure 3A:
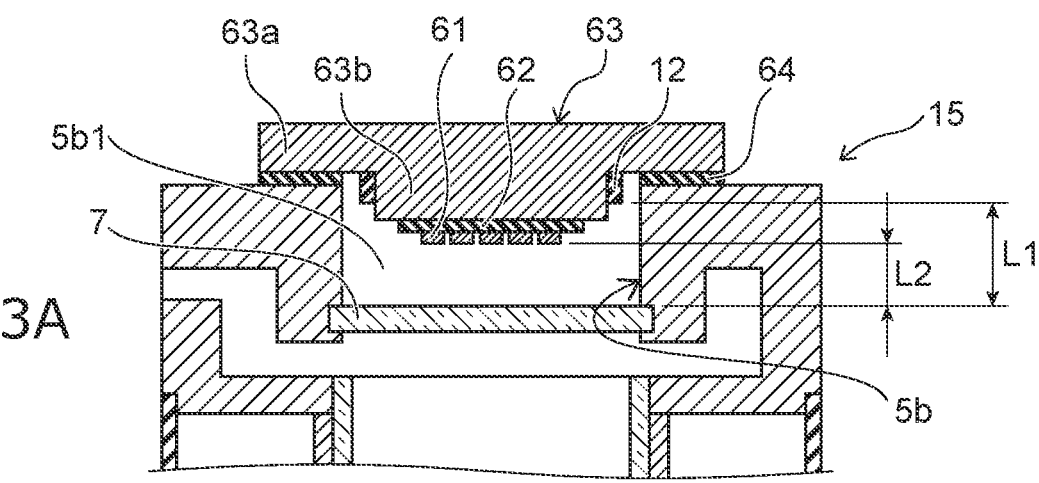
FIGS. 3A to 3C are schematic cross-sectional views for exemplifying the sealing of a space.
Figure 3B:
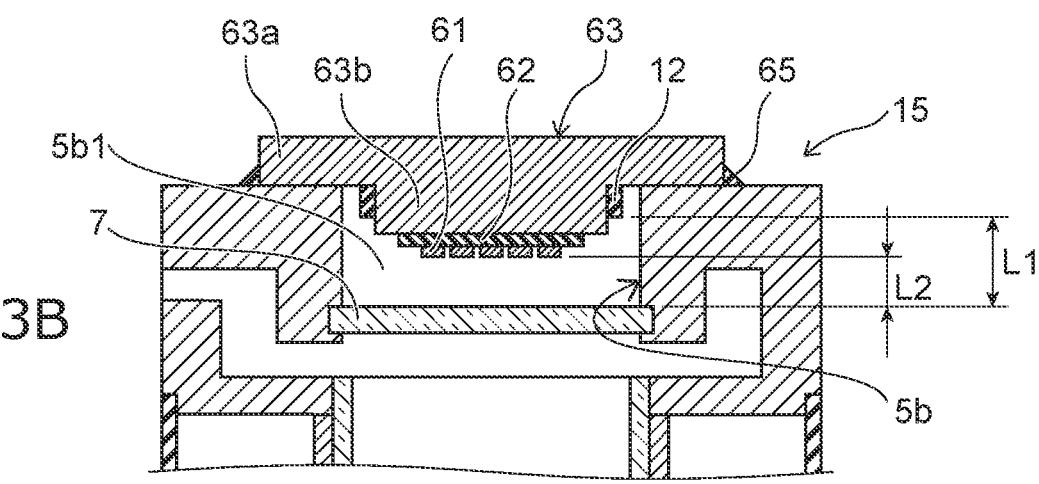
Figure 3C:
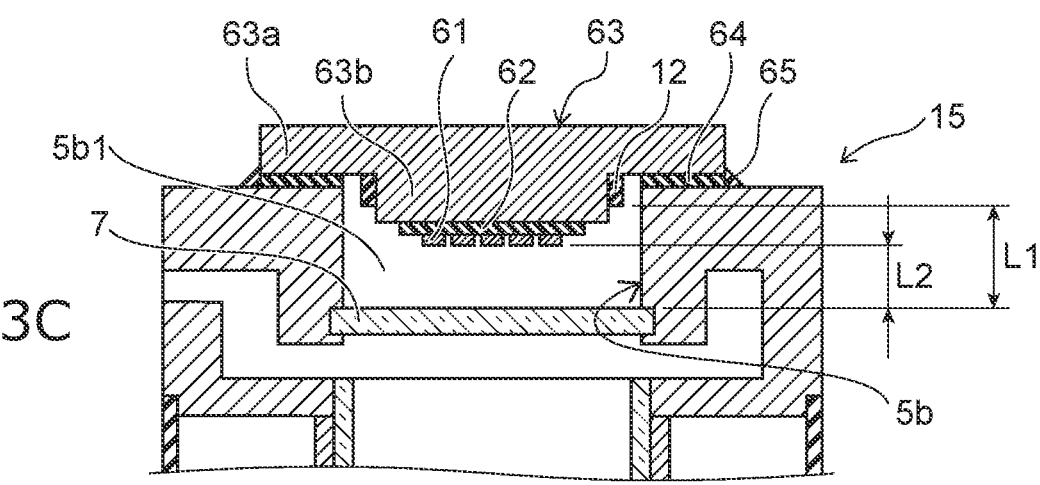

FIGS. 3A to 3C are schematic cross-sectional views for exemplifying the sealing of the space 5b1.

It should be noted that the embodiment exemplified in FIG. 2A will be used as an example in the description of FIGS. 3A to 3C and yet the same can be applied to the embodiments exemplified in FIGS. 1 and 2B to 2D.

As illustrated in FIG. 3A, a seal member 64 (corresponding to an example of a first seal member) can be provided between the flange 63a of the holder 63 and the end face of the discharge head 15 on the side opposite to the tube portion 2 side. The seal member 64 can be, for example, packing, an O-ring, or the like. The material of the seal member 64 can be, for example, synthetic rubber such as nitrile rubber, silicone resin, fluororesin, and so on.

With the seal member 64 provided, the space between the holder 63 and the discharge head 15 can be sealed, and thus intrusion of outside air containing water vapor into the space 5b1 can be suppressed. Accordingly, the time during which the dry state caused by the desiccant 12 can be maintained can be increased.

As illustrated in FIG. 3B, a seal member 65 (corresponding to an example of a second seal member) can be provided that is in close contact with the side surface of the flange 63a of the holder 63 and the end face of the discharge head 5 on the side opposite to the tube portion 2 side. The seal member 65 can be formed by, for example, applying a caulking material containing a silicone resin or the like along the side surface of the flange 63a.

With the seal member 65 provided, the space between the holder 63 and the discharge head 15 can be sealed, and thus intrusion of outside air containing water vapor into the space 5b1 can be suppressed. Accordingly, the time during which the dry state caused by the desiccant 12 can be maintained can be increased.

In addition, the caulking material is removed and reapplied with ease, and thus maintainability can be improved when the desiccant 12 is replaced.

In addition, the seal member 64 and the seal member 65 can be provided as illustrated in FIGS. 3A and 3B. In this manner, the space between the holder 63 and the discharge head 15 can be more reliably sealed. Accordingly, the time during which the dry state caused by the desiccant 12 can be maintained can be further increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A fluid sterilization device comprising:
   a tube portion;
   a supply head provided in one end portion of the tube portion;
   a discharge head provided in the other end portion of the tube portion and having a first hole penetrating a space between an end face of the discharge head on the tube portion side and an end face of the discharge head on a side opposite to the tube portion side;
   a holder having a flange and a protruding portion projecting from one surface of the flange and provided in the first hole of the discharge head;
   a substrate provided on an end face of the protruding portion on a side opposite to the flange side;
   a light-emitting element provided on a surface of the substrate on a side opposite to the protruding portion side and emitting ultraviolet rays;
   a window provided in the first hole of the discharge head and facing the light-emitting element; and
   a desiccant provided outside the discharge head and in a space communicating with the first hole of the discharge head or in the first hole of the discharge head, the desiccant absorbing water vapor contained in an atmosphere surrounding the desiccant.

2. The device according to claim 1, wherein the desiccant is provided in the first hole of the discharge head, and L1 (mm)≥L2 (mm) is satisfied when L1 (mm) is a distance between the desiccant and the window and L2 (mm) is a distance between a surface of the light-emitting element emitting the ultraviolet rays and the window.

3. The device according to claim 1, further comprising a housing detachably provided on the discharge head, wherein the space communicating with the first hole of the discharge head is an internal space of the housing, and the desiccant is provided in the internal space of the housing.

4. The device according to claim 3, wherein the housing is provided on the discharge head so as to be airtight.

5. The device according to claim 3, wherein the discharge head further has a second hole allowing the first hole of the discharge head and the internal space of the housing to communicate with each other.

6. The device according to claim 5, wherein the second hole of the discharge head is open to a side surface of the discharge head and an inner wall of the first hole of the discharge head.

7. The device according to claim 5, wherein the second hole of the discharge head is open to the end face of the discharge head on the side opposite to the tube portion side and an inner wall of the first hole of the discharge head.

8. The device according to claim 1, wherein
   a gap is provided between an inner wall of the first hole of the discharge head and a side surface of the protruding portion, and
   the desiccant is provided in the gap.

9. The device according to claim 8, wherein the desiccant is provided on at least one of the inner wall of the first hole of the discharge head and the side surface of the protruding portion.

10. The device according to claim 1, wherein
    a first recess portion is provided in a side surface of the protruding portion, and
    the desiccant is provided in the first recess portion.

11. The device according to claim 10, wherein a part of the side surface of the protruding portion where the first recess portion is not provided is in contact with an inner wall of the first hole of the discharge head.

12. The device according to claim 1, wherein a recess portion is provided in an inner wall of the first hole of the discharge head, and the desiccant is provided in the recess portion.

13. The device according to claim 12, wherein a side surface of the protruding portion is in contact with a part of the inner wall of the first hole of the discharge head where the recess portion is not provided.

14. The device according to claim 1, wherein
    the flange is provided on the end face of the discharge head on the side opposite to the tube portion side, and
    the device further comprises at least one of:
    a first seal member provided between the flange and the end face of the discharge head on the side opposite to the tube portion side; and
    a second seal member coming into close contact with a side surface of the flange and the end face of the discharge head on the side opposite to the tube portion side.

15. The device according to claim 14, wherein the first seal member is packing or an O-ring.

16. The device according to claim 14, wherein the second seal member contains a caulking material.

17. The device according to claim 1, wherein the desiccant contains at least one of silica gel, calcium oxide, and calcium chloride.

18. The device according to claim 1, wherein the supply head has a second hole penetrating a space between an end face of the supply head on the to be portion side and an end face of the supply head on a side opposite to the to be portion side.

19. The device according to claim 18, further comprising a fluid supply source connected to the second hole.

20. The device according to claim 19, wherein a temperature of a fluid supplied from the fluid supply source is lower than a temperature of an environment where the device is provided.

\* \* \* \* \*